US007620522B2

(12) United States Patent
Bredau et al.

(10) Patent No.: US 7,620,522 B2
(45) Date of Patent: Nov. 17, 2009

(54) DIAGNOSTIC DEVICE FOR AT LEAST ONE PNEUMATIC VALVE ACTUATOR ARRANGEMENT

(75) Inventors: Jan Bredau, Esslingen (DE); Reinhard Keller, Ostfildern (DE)

(73) Assignee: Festo AG & Co., Esslingen (DE)

( * ) Notice: Subject to any disclaimer, the term of this patent is extended or adjusted under 35 U.S.C. 154(b) by 33 days.

(21) Appl. No.: 11/663,619

(22) PCT Filed: Nov. 19, 2004

(86) PCT No.: PCT/EP2004/013157

§ 371 (c)(1),
(2), (4) Date: Mar. 21, 2007

(87) PCT Pub. No.: WO2006/056214

PCT Pub. Date: Jun. 1, 2006

(65) Prior Publication Data

US 2008/0065355 A1 Mar. 13, 2008

(51) Int. Cl.

| | |
|---|---|
| ***G06F 11/30*** | (2006.01) |
| ***G21C 17/00*** | (2006.01) |
| ***G01M 15/00*** | (2006.01) |
| ***G01L 27/00*** | (2006.01) |
| ***F01B 25/26*** | (2006.01) |
| ***F01B 31/12*** | (2006.01) |

(52) U.S. Cl. ....................... 702/183; 702/113; 702/114; 702/127; 702/185; 73/1.72; 73/37; 73/40.5 R; 91/1

(58) Field of Classification Search ................. 702/183, 702/185, 127, 114, 113; 73/40.5 R, 1.72, 73/37; 91/1
See application file for complete search history.

(56) References Cited

U.S. PATENT DOCUMENTS 4,903,456 A * 2/1990 Meur ............................ 53/69

(Continued)

FOREIGN PATENT DOCUMENTS

DE 196 28 221 4/1998

(Continued)

OTHER PUBLICATIONS

International Search Report for corresponding International Application PCT/EP2004/013157.

*Primary Examiner*—Eliseo Ramos Feliciano
*Assistant Examiner*—Janet L Suglo
(74) *Attorney, Agent, or Firm*—Hoffman & Baron, LLP

(57) ABSTRACT

A diagnostic device for at least one pneumatic valve actuator arrangement, comprises a pressure sensor, a volumetric flow sensor, a control means for producing control signals for the valve actuator arrangement and position sensors for detecting the position of at least one moving actuator member. The diagnostic device also includes a first diagnostic module for leak detection, a second diagnostic module for the detection of a choking effect in pneumatic supply and venting lines and at least one third diagnostic module for the detection of load and friction changes in the case of the moving actuator member and/or of valve switching faults, switching means being provided for deactivating the at least one third diagnostic module in the case of the detection of a fault by the first and/or second diagnostic module. Using this diagnostic device it is possible to detect, owing to cooperation of the diagnostic modules, faults and trouble conditions in an extremely systematic fashion both qualitatively and quantitatively.

18 Claims, 1 Drawing Sheet

U.S. PATENT DOCUMENTS

| | | | | |
|---|---|---|---|---|
| 5,197,328 | A * | 3/1993 | Fitzgerald | 73/168 |
| 5,337,262 | A | 8/1994 | Luthi et al. | |
| 6,886,545 | B1 * | 5/2005 | Holm | 123/568.21 |
| 7,047,152 | B2 * | 5/2006 | Horch | 702/154 |
| 7,124,057 | B2 * | 10/2006 | Forster et al. | 702/183 |
| 2003/0125841 | A1 * | 7/2003 | Schlosser | 700/282 |
| 2004/0039488 | A1 | 2/2004 | Junk et al. | |

FOREIGN PATENT DOCUMENTS

| | | |
|---|---|---|
| DE | 100 52 664 | 5/2002 |
| DE | 102 58 873 | 7/2003 |

* cited by examiner

DIAGNOSTIC DEVICE FOR AT LEAST ONE PNEUMATIC VALVE ACTUATOR ARRANGEMENT

This application is a National Phase application of International Application No. PCT/EP2004/013157, filed Nov. 19, 2004, which is incorporated herein by reference.

BACKGROUND OF THE INVENTION

1. Field of the Invention

The invention relates to a diagnostic device for at least one pneumatic valve actuator arrangement, comprising a pressure sensor, a volumetric flow sensor, a control means for the production of control signals for the valve actuator arrangement and position sensors for finding the position of at least one moving actuator member.

2. Description of the Related Art

Such diagnostic devices are for example disclosed in the German patent publications 19628221 C2 and 10052664 A1 and serve more particularly for process monitoring. In the case of the known devices stored reference characteristics for pressure, as for example at an actuator and/or for the volumetric flow rate of the pneumatic medium are compared with currently measured pressure characteristics and volumetric flow rate characteristics, departures from predetermined tolerances leading to diagnostic warnings. The known devices are merely suitable for determining the position of the fault, i.e. at which valve or which actuator or which valve actuator arrangement is failing in its function. The precise type of fault in function may however not be found using the known devices.

SUMMARY OF THE INVENTION

One object of the present invention is to create a diagnostic device for such valve actuator arrangements, by which also the type of the fault occurring may be detected and a warning issued.

This aim is achieved in the invention by means of a diagnostic device with the features of claim 1.

The advantages of the diagnostic device in accordance with the invention are in particular that faults occurring may be determined exactly while avoiding involved mathematical models and using a relatively small sensor system. The diagnostic warnings generated provide exact information about the type and position of the fault in the valve actuator arrangement. Owing to the cooperation of different diagnostic modules and in particular owing to the order of the processing steps it is possible for clear statements to be made about faults and for incorrect detection of faults to be avoided.

The features defined in the dependent claims represent advantageous further developments of the diagnostic device defined in claim 1.

In an advantageous manner the third diagnostic module serves for the detection of load and friction changes at the moving actuator member, a fourth diagnostic module being provided for detection of valve switching faults, which is deactivated for detection by the third diagnostic module. Same serves for making a clear distinction between these two types of fault.

The first diagnostic module is designed for monitoring the pressure medium at the pressure sensor in a sealed chamber under pressure of the actuator during pause phases preferably detected by position sensors. The latter may accordingly be employed in an advantageous fashion for diagnosis. For this purpose the diagnostic module possesses means for finding the pressure gradient and/or the leak volumetric flow and/or the flow conductance at the leak and furthermore comparison means for comparison with reference values, such that which when they are exceeded a leak warning is produced. On the basis of this it is possible even for quantitative data to be derived. Taking into account the fact that in the case of an internal leak (for example at a defective piston seal) the leak conductance path becomes smaller and smaller, whereas in the case of an external leak it remains practically constant during the time of measurement, it is possible furthermore to distinguish, using suitable evaluation means, between the internal and external leakage.

The recognition of a choking effect in the valve actuator arrangement is preferably by using the second diagnostic module, which in each case monitors the flow conductance motion phases detected by the position sensors, of the moving actuator member. The second diagnostic module accordingly operates alternatingly with the first diagnostic module, which operates in the pause phases.

The second diagnostic module preferably exhibits means for the calculation of the mean value of the flow conductance during movement of the actuator member, comparison means being provided for checking such mean values as regards departures for at least one reference value, which as from a predeterminable limit value departure produce a warning as regards an irregular choking effect. Since the temperature has a substantial influence on the flow conductance, switching or circuit means are provided to deactivate the second diagnostic module on a predeterminable threshold temperature being exceeded or in the case of extreme temperature changes.

The third diagnostic module serving for the detection of changes in load and friction at the moving actuator member is best designed for monitoring one of the following pressure values as regards departures from predeterminable standard pressure values: maximum pressure between an actuating signal and a corresponding start of the movement phase starting at a terminal position, mean pressure during the movement phase during filling of an actuator chamber, mean pressure during the movement phase on emptying such actuator chamber. If all these pressure values are monitored, then it is possible to distinguish between a plurality of possible faults as regards changes in load and friction. In this case only the signal of the pressure sensor and of position sensors is required for recognition of movement.

A preferred type of evaluation is implemented by means for calculation of the equivalent force values and for finding and evaluation of departures from corresponding standard values.

The fourth diagnostic module provided for detection of valve switching faults only operates absent the production of a diagnostic warning by any other diagnostic module. It is only then in fact that it is possible to conclude with certainty that there is a valve sensor fault. For this purpose in an advantageous manner the time of the increase in pressure as from a corresponding valve switching signal as far as a predeterminable percent value of its terminal pressure value and/or the time of the pressure drop as from a corresponding valve switching signal down to a set lowered percentage of the terminal pressure is monitored. For this purpose the fourth diagnostic module possesses means responsive to the terminal pressure value when the actuator is filled and during a stationary state of the actuator member.

In a preferred design the fourth diagnostic module exhibits means for timing the increase in pressure and/or reduction in pressure and for determining the departure value for standard times, which as from predeterminable differential values being exceeded produce a diagnostic warning.

A further improvement and completion of a diagnosis may be achieved by a permanently operative fifth diagnostic module, which is designed for monitoring air consumption and/or pressure level and/or positioning times and cycle times, circuit means being provided serving for deactivating the at least one third diagnostic module in the case of fault detection by the fifth diagnostic module. Accordingly faults may be detected as trouble conditions which are not clearly able to be linked with the faults in the other modules and independently from the type of fault detect corresponding trouble conditions in air consumption, pressure level or in positioning times and cycle times.

The fifth diagnostic module preferably possesses comparison means for comparison with corresponding reference values, for detection of departures from the reference values and for checking the departures as regards exceeding predeterminable threshold values, which lead to a diagnosis warning.

One working example is represented in the accompanying drawing and will be explained in the following description.

DETAILED DESCRIPTION OF THE PREFERRED EMBODIMENTS.

Figure 1:
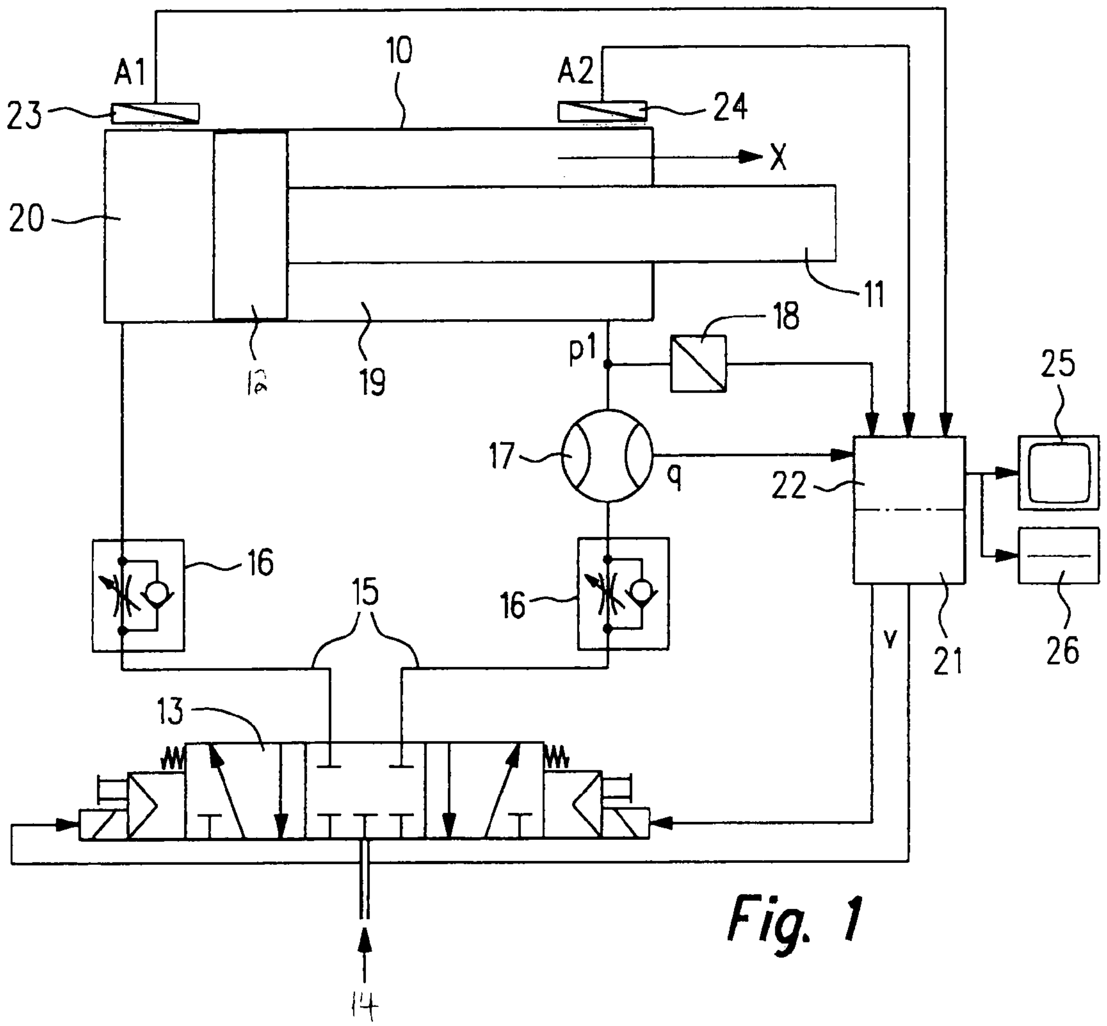
FIG. 1 shows a valve actuator arrangement in the form of a pneumatic cylinder and control valve, which is connected with a diagnostic device as a working example of the invention.

The valve actuator arrangement illustrated in FIG. 1 comprises a diagrammatically indicated pneumatic cylinder 10 wherein a piston 12 provided with a piston rod 11 is able to be pneumatically driven. This pneumatic cylinder 10 represents one possible design of an actuator, other actuator designs also being possible such as those involving different sorts of linear drives, servo drives, rotary or the like.

For the operation of the piston 12 use is made of valve 13, which for example may be in the form of a 5/2 or 5/3 routing valve. This valve 13 is connected with a pressure supply line 14 for the supply of a working pressure p. By way of lines 15 the piston 12 may be subjected to pressure on the one or other side in accordance with the valve setting so that the piston may be shifted in a controlled manner in either of the two directions of motion. Instead of a routing or switching valve it is also possible in principle to provide a proportional valve, it being possible for the respective valve to be integrated on or on the pneumatic cylinder.

In the two lines 15 between the valve 13 on the one hand and the two terminal portions of the pneumatic cylinder 10 on the other hand choke check valves 16 are provided. In the line 15 for supplying the rod side of the piston 12 with pressure a volumetric flow rate sensor 17 and a pressure sensor 18 responsive to the pneumatic pressure in the cylinder chamber on the rod side are arranged. In principle the volumetric flow rate sensor 17 and the pressure sensor 18 may also be connected with the oppositely placed cylinder chamber 20.

An electronic control means 21 serves for control of the valve 13 and accordingly the movement and position of the piston 12 in the pneumatic cylinder 10. This electronic control means 21 is provided with electronic diagnostic circuitry 22, the electronic diagnostic circuitry 22 being integrated in the electronic control means 21 or being in the form of a separate piece of equipment. The pressure sensor 18 and the volumetric flow rate sensor 17 and furthermore the position sensors 23 and 24 responsive to the terminal position or, respectively, terminal locations of the piston 12 are connected with inputs of the electronic diagnostic circuitry 22. The control signals of the electronic control signals 21 for the valve 13 are also fed to the electronic diagnostic circuitry 22, in the illustrated integrated form by internal lead means.

By means of the electronic diagnostic circuitry 22 it is possible for faults, dysfunctions or defects to be displayed and/or registered. For this purpose the electronic diagnostic circuitry 22 or the electronic control device 21 may possess a fault memory. Furthermore the output side of the electronic diagnostic circuitry is connected with a display 25 and a printer 26 in order to be able to display or, respectively, print diagnostic warnings. This equipment serving as display device for diagnostic warnings may naturally be replaced by other, simpler devices, as for instance an LED fault display means, by which the different types of faults are indicated.

Figure 2:
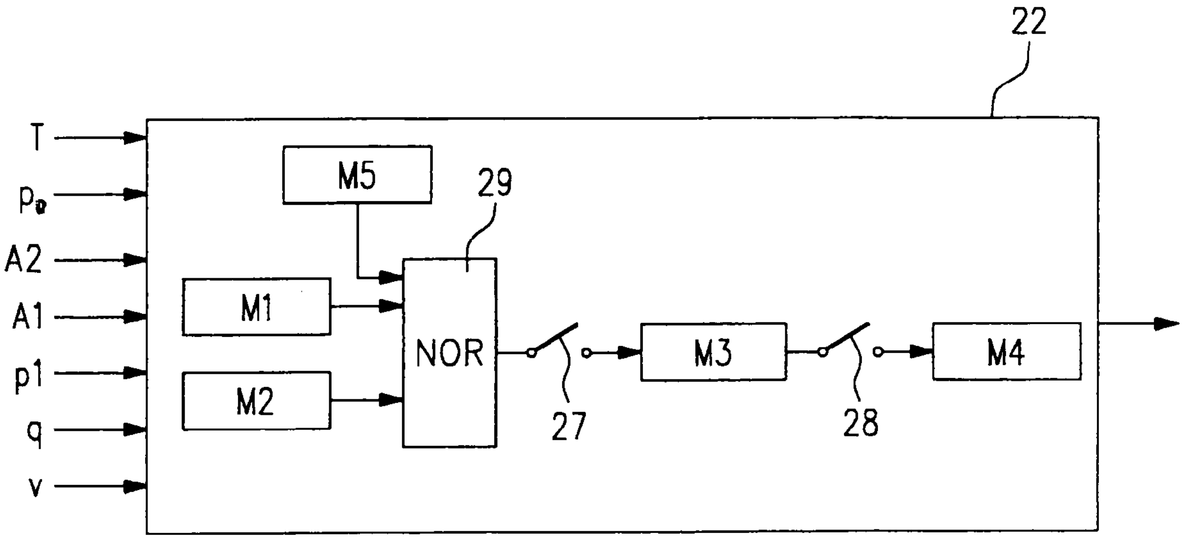
FIG. 2 is a detailed representation with a division up of the diagnostic device into diagnostic modules.

FIG. 2 shows the diagnostic device with details of the course of diagnostics with diagnostic functions as a diagram. Significant in this case is the cooperation between the individual diagnostic modules M1 through M5 and, respectively, the order of their operation in order to produce clear findings relevant for faults. A further significant point is the systematic evaluation of the diagnostic information from the individual diagnostic modules M1 through M5 for a pneumatic subsystem, which in the working example of FIG. 1 is in the form of a valve actuator arrangement 10 and 13.

In it the diagnostic modules M1 through M5 monitor the valve actuator arrangement as regards frequently occurring qualitative and quantitative faults.

The diagnostic modules in accordance with FIG. 2 are basically only activated, when the operating pressure p does not depart by more than predetermined tolerances from a reference pressure. In a first step the diagnostic modules Ml and M2 are started in order to examine the subsystem as regards leaks and, choking effects in the power line. These two modules are permanently active with the above limitation, since they always supply clear statements or data. When there are no leaks or choking effects, the module M3 is activated for monitoring changed loads or friction. Should this module also not detect any departures from predetermined reference standards, the module M4 may be activated for the detection of valve faults. If a fault occurs in this chain, the following module is always deactivated. This is indicated diagrammatically by the switches 27 and 28. This order ensures that the diagnostic modules always provide correct fault information.

The diagnostic module M5 operates constantly. This module M5 monitors the cycle and travel times, the pressure and the air consumption for departures. In this case trouble conditions in the subsystem are detected independently of the type of fault, which make themselves felt in the travel time or the pressure or the volumetric flow rate. Accordingly faults are detected as trouble conditions, which do not clearly correspond to the faults in the diagnostic modules M1 through M4. The NOR gate 29 ensures that the diagnostic modules M3 and M4 are only activated, when the diagnostic modules M1, M2 and M5 have not detected any fault or trouble condition. As already stated, in the case of the diagnostic module M4 there is the additional condition that the diagnostic module M3 has not detected a fault or trouble condition.

In the case of the first diagnostic module M1 serving for the detection of a leak during pause phases, in which the piston 12 is in one of its terminal positions, the module. M1 is shut off on the side subject to the pressure p1,. In the working embodiment illustrated it is a question of the cylinder chamber 19 since same is connected with the pressure sensor 18. During this measurement time, which is the same as the length of the pause phase, the pressure gradient $\Delta p/\Delta t$ is determined. The pressure difference is the determined from the difference between the starting value and the terminal value. The calculated leak flow changes with time, since the cylinder chamber 19 under pressure empties. The leaked flow $Q_1$ is:

$$Q_l = \frac{V * \Delta p / \Delta t}{p_N} \quad (1)$$

Here V is the chamber volume, and $p_N$ the reference pressure, both being constants. In order to obtain a comparison size for the size of the leak, the guide value C is calculated. The C value is proportional to the opening area of the leak and is found from:

$$C = \frac{Q_l}{p} \quad (2)$$

The guide value C is, like the pressure gradient, constantly updated during the entire measurement operation, and is therefore a function of time C=C(t). When there is no leakage, the guide value C assumes values of nearly 0. Owing to measurement noise however as a guide reference $C_{ref}$ a value >0 is set. In the case of a leak the measured C value exceeds the reference guide value and is approximately constant. In order to get a meaningful comparison value from the C values produced during the measuring operation a maximum value $C_{max}$ is found. This value is then compared with the reference value.

The pause phases or, respectively, the measurement time is detected by the terminal switch signals and from a knowledge of the processing sequence. If the supply pressure p sinks to below a predeterminable minimum value of, for instance, 2 bar, then the formula for the calculation of the guide value is no longer valid and the measuring operation is interrupted.

For the detection of different leaks or leakages the size of the guide value reference may be individually adapted. An additional evaluation is made possible owing to the difference between an internal leak at the piston, for example in the case of a leaking or otherwise defective piston seal, and an external leak, for instance owing to a leaking or piston rod seal or defective flexible pipes or lines. In the case of an internal leak venting takes place into the other cylinder chamber. Accordingly the pressure drop is initially relatively large and with an increasing pressure in the chamber to be charged the leak flow and the C value become smaller and smaller until at pressure equality the volumetric flow and the C value approach zero. This is a clear clue for an internal leak. An additional clue for an internal leak is that on flow past the piston seal with the chamber shut off a movement of the actuator is possible, when it is a question of an actuator with the different acting faces, as is for example the case with a differential cylinder. During transfer flow there is pressure compensation between the two actuator chambers. Owing to the different piston areas a force acts causing the actuator to leave the terminal position. By means of the terminal position switch of the position sensor 24 or, respectively, 23 this is able to be detected.

In the case of an external leak venting is to the outside. In the case of complete emptying of the cylinder chamber it is possible to conclude that there is an external leak. The C value is in this case practically constant during the measurement time and as a criterion as regards the level of the leak the C value at the end of the measurement is employed. If the measuring time is not long enough, no complete discharge takes place and it is not possible to clearly distinguish between an internal and an external leak. For most applications it is however possible to assume that there is an external leak in the case of a constantly sinking pressure during the measurement time. The measurement time should therefore be selected to be as long as possible, i.e. the pause times should be effectively employed.

If the quantitative size of the leak current is of interest, then it is necessary to find the reference pressure $\rho_n$ in accordance with the following equation:

$$p_n = \kappa * \rho_N * T * R \quad (3)$$

in which $\rho_N$ is the normal density, the volumetric flow rate being, dependent on the selected standardization, equal to 1.293 kg/cubic meter. T denotes the reference temperature, the operational temperature being used if desired for rough estimation. The venting operation is assumed to be isothermal so that κ=10.0. For dry air R is equal to 287 J/(kg*K) and for air at 65% relative humidity R is equal to 288 J/(kg*k). Accordingly for normal conditions there will be a reference pressure corresponding to the normal pressure (pn) equal to 1.0135 bar. This value may be employed in the first equation, from which the leak flow rate may be calculated using the remaining parameters.

The detection of an increasing or furthermore decreasing choking effect (for example involving resetting of the choke or blockage or kinked flexible lines) is based on the use of the pressure signal p1 and of the volumetric flow rate q in the respective power line. The sensor system is then arranged on the piston rod side in accordance with FIG. 1, that is to say connected with the cylinder chamber 19. The diagnostic module M2 finds whether there is a choking effect in all the line starting at the valve 13 as far as the connection with the cylinder chamber 19. The cause for an increasing or, respectively, decreasing choking effect may be for example an open or closed discharge choke, a kinked flexible line, blockage in the line, icing, choking effects in the connection line of the pneumatic cylinder 10 or a valve failing to open.

Firstly a guide value C is determined as a diagnostic value from the pressure p1 and the volumetric flow rate q. This C value is a measure for the area subject to flow and is compared with a reference value for fault diagnostics. For the calculation for the guide value C the extension and/or retraction direction of the actuator may be utilized. A movement phase will suffice. Preferably the direction of movement X in accordance with FIG. 1 is employed, in the case of which venting takes place from the cylinder chamber 19. The guide value C for such extension direction is calculated from the following equation:

$$q = C * p1 \sqrt{\frac{T_N}{T_B}} * \sqrt{1 - \left[\frac{p_u/p_1 - b}{1 - b}\right]^2} \quad (4)$$

where $p_u$ denotes the pressure of the surroundings into which venting takes place. The equation defines the conditions during subcritical operation states, in which $p_u/p_1 > b$. The characteristic b may be freely selected for diagnostics as a constant equal to 0.528. $T_n$ denotes normal temperature and $T_B$ the temperature in the pressure chamber, which may be approximately equated with the operating temperature. Absent extreme temperature changes, temperature is not taken into account for diagnostics. In the case of major temperature changes the diagnostic module M2 is deactivated.

For supercritical operating conditions ($p_u$/pl=b) the following equation will apply:

$$q = C * pl\sqrt{\frac{T_N}{T_B}} \tag{5}$$

The calculated guide value is constantly updated during the entire measuring operation and is therefore a function of the time, i. e. C=C(t). In the case of a constant flow area however the dynamically calculated guide value is practically constant. In the case of venting or filling however pressure peaks and accordingly also short peaks may occur in the guide value. During the measurement operation the calculated guide values C are employed to derive a mean value and which is compared with a reference guide value. The difference between the measured value and the reference guide value is compared with a maximum permitted tolerance value, such that when it is exceeded a diagnostic warning is issued indicating that there is a choking effect which is too low or too high. The guide value is in this case found during the movement of the piston 12, for which purpose the terminal switch signals of the position sensors 23 and 24 are employed.

The diagnostic module M3 serves for detecting changes in load and friction at the actuator, that is to say at the pneumatic cylinder 10 or, respectively, mechanism attached thereto. As already noted this module is only activated, when previously it has been found that no choking effects or leaks have occurred, i.e. the diagnostic modules M1 and M2 have hot detected any faults, something which also applies for the diagnostic module M5, which will be described below. For this diagnosis only the pressure sensor 18 is required. For calculation the pressure build up phase (charging of the cylinder chamber 19) and the movement phases (extension and retraction) may be utilized. These phases are described in the following.

During the pressure build up phase (phase 1) the piston 12 is stationary. This phase is defined as extending from the switching signal at the valve 13 until the point in time, at which the piston 12 leaves its terminal position. The phase 2 is the travel phase, in which the cylinder chamber 19 is charged. The phase 3 is the travel phase in the opposite direction X, in which the cylinder chamber 19 is vented again.

In the phase 1 the maximum pressure occurring is determined. On the basis of the known working piston area the equivalent force $F_{max}$ is calculated. Here it is assumed that the second cylinder chamber 20 is vented when the piston is stationary or a constant pressure predominates thereat. From the measured pressure during the travel time in the phase 2 a mean pressure is calculated, from which again a mean equivalent force $F_{med1}$ is calculated. The same applies for the phase 3, in which again a mean equivalent force $F_{med2}$ is calculated. For getting the mean pressure value the pressures are summated and divided by the number of measured values. To get meaningful values or data preferably the characteristics are recorded for several cycles, then there is an intermediate storage and then the generation of mean values.

For all measured force values, stored reference values are present, which occur during proper function. From them and the measured force values the respectively relevant difference values $\Delta F_{max}$, $\Delta F_{med1}$ and $\Delta F_{med2}$ are produced. During evaluation these difference values are examined as to whether they are outside predetermined tolerance limits. From the combinations of the results so obtained it is possible to produce different diagnostic predictions:

If one of the difference values significantly exceeds the predetermined tolerance value, then there is a fault as regards the friction or load states.

If all three difference values are positive and exceed the predetermined tolerance value there is a drawn load, i.e. a load directed against the respective force direction.

If all three difference values are negative and exceed a tolerance value, there is a thrust load, i.e. a load acting in the force direction.

If $\Delta F_{max}$ exceeds its permissible tolerance limit and however the remaining values within their tolerance limits, it is a question of an increase in stiction.

If the difference value $\Delta F_{med1}$ climbs and the value $\Delta F_{med2}$ decreases, sliding friction has increased.

Further combinations render possible additional diagnoses. The respective combinations may also be defined in a manner specific to the actuator. The results may be stored and shown at the display 25 or, respectively, presented by way of the printer 26.

The input of the reference values may be manual or may be automatically determined. In this respect it is to be observed that such reference values are registered in the "good condition" of the cylinder (or of some other actuator or a system, respectively) or, respectively, during retraction stroke.

The diagnostic module 4, which serves for detection of a valve switching fault, is only activated when the other diagnostic modules do not signalize any fault, trouble condition or defect. If none of these diagnostic modules M1 through M3 and M5 have signalized any changes in the pressure build up, it is to be concluded that there is retarded or accelerated opening behavior of the valve 13 as a cause. For the detection only the pressure sensor 18 in the respective power line is required. In a manner similar to the case of the diagnostic module 3, the pressure build up phase is employed in order to measure the time of the pressure increase. The a diagnosis characteristic is formed which typifies the switching time. From a comparison of this switching time with a reference switching time it is then possible to make a conclusion about the correct or incorrect switching of the valve 13. A measurement phase 1 starts on switching on the valve 13, that is to say with a switching on signal and terminates with the start of movement of the piston out of its terminal position. In addition as a measurement phase 2 the pressure build up or, respectively, venting phase is utilized. Accordingly the time for switching back of the valve may be evaluated. The measurement phase 2 starts on switching on or reversing of the valve 13, while the piston is in its terminal position.

In the measurement phase 1 representing a pressure build up phase the time is measured for the pressure to have reached a predetermined percentage of its terminal value or, respectively, its maximum value. Much the same applies for the measurement phase 2 as a pressure build up phase, in which the time is measured for the pressure to fall to a predetermined percentage value of its maximum. The measured time values are compared with reference time values and the difference values formed are re-examined as regards their exceeding predetermined tolerance values.

For diagnostics the terminal value or, respectively, the maximum pressure value of the charged chamber is required in the stationary state. The value can be measured once and stored, although it may be updated with each measurement.

The diagnostic module 5 operates permanently. It requires the terminal switch signals of the position sensors 23 and 24 and the signals of the pressure sensor 18 and furthermore of volumetric flow rate sensor 17. In this module the cycle and travel times are stored, the pressure and the air consumption registered and monitored as regards departures. This diagnostic module hence detects, independently of the type of fault, trouble conditions in the monitored system, which make themselves felt in the travel times or the positioning times, pressure or consumption. Accordingly it is even possible to detect faults as trouble conditions, which are not clearly able to be associated with the faults, which are able to be detected by the other modules. The respective measured values or data, i.e. positioning time, travel time, air consumption, maximum pressure value and mean pressure value, are compared using suitable reference values. Hence difference values are formed and examined as regards their being below or above permitted tolerance values. This rough detection of faults may in an individual case then be followed by more specific fault detection using the diagnostic modules M1 through M4.

The diagnostic modules M1 through M3 constitute the most important diagnostic modules. In the case of simpler designs it is possible to do without the diagnostic module M4 and/or M5. In this case it is naturally also possible to add additional diagnostic modules.

The diagnostic modules may in principle be in the form of separate diagnostic circuits, though however they are preferably designed as functional groups of a diagnostic program, which is run either in the electronic diagnostic circuitry 22 or in the electronic control means 21 or, respectively, in central electronic control circuitry.

The invention claimed is:

1. A diagnostic device for at least one pneumatic valve actuator arrangement, comprising:

- a pressure sensor;
- a volumetric flow sensor;
- a control means for producing control signals for the at least one valve actuator arrangement;
- position sensors for detecting the position of at least one moving actuator member;
- a first diagnostic module for leak detection;
- a second diagnostic module for the detection of a choking effect in pneumatic supply and venting lines;
- at least one third diagnostic module for the detection of changes in load or changes in dynamic friction or for the detection of valve switching faults, the changes in dynamic friction being in response to movement of the actuator member;
- switching means being provided for deactivating the at least one third diagnostic module in the case of the detection of a fault by the first or second diagnostic module; and
- a fourth diagnostic module being provided for the detection of valve switching faults, which in the case of detection of a fault by the third diagnostic module is deactivated.

2. The diagnostic device as set forth in claim 1, wherein the first diagnostic module is adapted for monitoring the pressure by means of the pressure sensor in a sealed pressurized chamber of the actuator during pause phases preferably detected by position sensors.

3. The diagnostic device as set forth in claim 2, wherein the first diagnostic module possesses means for finding the pressure gradient ($\Delta p/\Delta t$) or of the leak volumetric flow rate ($Q_1$) or of the flow conductance value (C) for the leak and comparison means for comparison of the reference values, which when exceeded by predeterminable tolerance values produces a leak warning.

4. The diagnostic device as set forth in claim 2 wherein the first diagnostic module includes evaluation means for distinguishing an internal or external leak.

5. The diagnostic device as set forth in claim 1, wherein the second diagnostic module is adapted for monitoring the flow conductance value (C) during movement phases, detected by the position sensors, of the moving actuator member.

6. The diagnostic device as set forth in claim 5, wherein the second diagnostic module possesses means for the calculation of the mean value of the flow conductance value (C) during the movement of the actuator member and comparison means are provided for examining such mean value as regards departures from at least one reference value, which as from a predeterminable tolerance value departure produce a warning as regards an irregular choking action.

7. The diagnostic device as set forth in claim 1, wherein switching means are provided for deactivating diagnostic module on a predeterminable limit temperature being exceeded.

8. The diagnostic device as set forth in claim 1, wherein the third diagnostic module is designed for monitoring at least one of the following pressure values as regards departure from predeterminable standard pressure values, to wit:

- maximum pressure between the actuating signal and the corresponding start in the movement phase from a terminal position, mean pressure during the movement phase on charging an actuator chamber, mean pressure during the movement phase on discharge of this actuator chamber.

9. The diagnostic device as set forth in claim 8, wherein means are provided for calculation of the equivalent force values ($F_{max}$, $F_{med1}$ and $F_{med2}$) and for finding and evaluating difference values ($\Delta F_{max2}$, $\Delta F_{med1}$ and $\Delta F_{med2}$) from corresponding standard values, and when predeterminable tolerance values are exceeded a respective diagnostic warning is produced.

10. The diagnostic device as set forth in claim 1, wherein the fourth diagnostic module is adapted for monitoring the time of the pressure rise as from a corresponding valve switching signal (V) as far as a predeterminable percentage value of its pressure terminal value or of the drop in pressure starting at a corresponding valve switching signal (V) as far as a predeterminable percentage value of its terminal pressure value.

11. The diagnostic device as set forth in claim 10, wherein the fourth diagnostic module possesses means for detection of the pressure terminal value with the actuator chamber charged and in a stationary state of the actuator member.

12. The diagnostic device as set forth in claim 10 wherein the fourth diagnostic module exhibits means responsive to the time of pressure increase or pressure drop and for finding the difference values from reference times, which as from predeterminable tolerance values being exceeded produce a corresponding diagnostic warning.

13. The diagnostic device as set forth in claim 1, wherein a fifth diagnostic module is comprised for monitoring air consumption or pressure level or positioning time, and cycle times, switching means being present for deactivating the at least one third diagnostic module when a fault is detected by the fifth diagnostic module.

14. The diagnostic device as set forth in claim 13, wherein the fifth diagnostic module comprises comparison means for the comparison with corresponding reference values, for the detection of departures from the reference values and for examining the departures as regards predeterminable tolerance values being exceeded, such comparison means producing a corresponding diagnostic warning.

15. The diagnostic device as set forth in claim 13 wherein means are provided for detection of the air consumption between a valve control signal (V) causing a movement and a terminal position being reached, the air consumption being preferably the integral of the volumetric flow signal during the positioning time.

16. The diagnostic device as set forth in claim 13, wherein means are provided for the detection of maximum pressure value or the mean pressure value during a movement phase of the actuator member.

17. A diagnostic device for at least one pneumatic valve actuator arrangement, comprising:

a pressure sensor;

a volumetric flow sensor;

a control means for producing control signals for the at least one valve actuator arrangement;

position sensors for detecting the position of at least one moving actuator member;

a first diagnostic module for leak detection, the first diagnostic module being adapted for monitoring pressure by means of the pressure sensor in a sealed pressurized chamber of the actuator during pause phases preferably detected by the position sensors;

a second diagnostic module for the detection of a choking effect in pneumatic supply and venting lines;

at least one third diagnostic module for the detection of changes in load or changes in dynamic friction or for the detection of valve switching faults, the changes in dynamic friction being in response to movement of the actuator member; and switching means being provided for deactivating the at least one third diagnostic module in the case of the detection of a fault by the first or second diagnostic module.

18. A diagnostic device for at least one pneumatic valve actuator arrangement, comprising:

a pressure sensor;

a volumetric flow sensor;

a control means for producing control signals for the at least one valve actuator arrangement;

position sensors for detecting the position of at least one moving actuator member;

a first diagnostic module for leak detection;

a second diagnostic module for the detection of a choking effect in pneumatic supply and venting lines;

at least one third diagnostic module for the detection of changes in load or changes in dynamic friction or for the detection of valve switching faults, the changes in dynamic friction being in response to movement of the actuator member;

switching means being provided for deactivating the at least one third diagnostic module in the case of the detection of a fault by the first or second diagnostic module; and a fourth diagnostic module adapted for monitoring the time of the pressure rise as from a corresponding valve switching signal (V) as far as a predeterminable percentage value of its pressure terminal value or of the drop in pressure starting at a corresponding valve switching signal (V) as far as a predeterminable percentage value of its terminal pressure value.

* * * * *